(12) United States Patent
Mihaescu et al.

(10) Patent No.: US 12,181,361 B2
(45) Date of Patent: Dec. 31, 2024

(54) AUTOMATIC DECISION FOR SELF-DIAGNOSIS TRIGGERING IN SAFETY RELEVANT SENSORS

(71) Applicant: Infineon Technologies AG, Neubiberg (DE)

(72) Inventors: Radu Mihaescu, Bucharest (RO); Dan-Alexandru Mocanu, Bucharest (RO); Ilie-Ionut Cristea, Turnu Magurele (RO)

(73) Assignee: Infineon Technologies AG, Neubiberg (DE)

( * ) Notice: Subject to any disclaimer, the term of this patent is extended or adjusted under 35 U.S.C. 154(b) by 434 days.

(21) Appl. No.: 17/709,934

(22) Filed: Mar. 31, 2022

(65) Prior Publication Data
US 2023/0314258 A1 Oct. 5, 2023

(51) Int. Cl.
*G01L 27/00* (2006.01)
*B60C 23/04* (2006.01)

(52) U.S. Cl.
CPC ............ *G01L 27/007* (2013.01); *B60C 23/04* (2013.01)

(58) Field of Classification Search
CPC ....... G01L 27/007; G01L 17/00; B60C 23/04; B60C 23/0454; B60C 23/0457; B60C 23/0474; B60C 23/0481
See application file for complete search history.

(56) References Cited

U.S. PATENT DOCUMENTS

| | | | | |
|---|---|---|---|---|
| 5,260,683 A | * | 11/1993 | Tanaka | B60C 23/20 340/448 |
| 2017/0326926 A1 | * | 11/2017 | So | B60C 23/0474 |
| 2022/0074804 A1 | * | 3/2022 | Shimojo | G06F 3/0679 |

* cited by examiner

*Primary Examiner* — Peter J Macchiarolo
*Assistant Examiner* — John M Royston
(74) *Attorney, Agent, or Firm* — Harrity & Harrity, LLP

(57) ABSTRACT

A pressure sensor module includes a pressure sensor configured to periodically measure an internal air pressure within an enclosure and generate a sensor signal having plurality of sensor values; a signal processing chain for conditioning the sensor signal to generate a plurality of conditioned sensor values; a memory configured to store each of the plurality of conditioned sensor values; and a processing circuit coupled to the pressure sensor via the signal processing chain for receiving a current conditioned sensor value and coupled to the memory for receiving a previous conditioned sensor value. The processing circuit is configured monitor for a fault, including calculating a delta pressure value between the current and previous conditioned sensor values, comparing the delta pressure value to a pressure threshold value, and triggering a diagnostic of the signal processing chain if the delta pressure value is greater than the pressure threshold value.

22 Claims, 3 Drawing Sheets

AUTOMATIC DECISION FOR SELF-DIAGNOSIS TRIGGERING IN SAFETY RELEVANT SENSORS

BACKGROUND

Tire Pressure Monitoring Systems (TPMS) play an important role in vehicle safety and emissions reduction. A majority of this market is served by direct tire pressure monitoring systems, in which each tire contains a TPMS sensor module. Thus, a battery powered sensor module is assembled in the inside of a tire to monitor a tire pressure thereof. The sensor module contains a pressure sensor, a microcontroller, a radio-frequency (RF) transmitter, and a coin battery cell used to supply power to the components of the sensor module.

Principally, the sensor module measures the tire pressure and uses a unidirectional link to transmit the measurement data to a central unit in the vehicle. Since coin battery cell cannot be replaced, sensor module lifetime is determined by battery lifetime of the sensor module. Each sensor measurement and evaluation requires processing power. Additionally, it is also important to ensure that the sensor module is operating correctly throughout its lifetime. Thus, a sensor module may be configured to perform an internal diagnostic of its pressure sensor and of its signal processing chain. However, performing the internal diagnostic increases power consumption and reduces the lifetime of the sensor module due to depletion of the battery cell. Another significant portion of the power consumption is generated by the RF transmission. Hence, it is important to the reduce power consumption for performing these tasks as much as possible.

Battery monitoring systems may be installed in an enclosure of a battery in order to monitor a state of the battery. For example, a battery monitoring sensor can be used in the enclosure of the battery in an electric car to detect thermal runaway. This can be detected as a jump in the ambient pressure inside the battery enclosure. Thus, sensor module contains at least a pressure sensor, a microcontroller, and a coin battery cell. Again, because the coin battery cell cannot be replaced, sensor module lifetime is determined by battery lifetime. Each sensor measurement and evaluation requires processing power. Additionally, the sensor module may be configured to perform an internal diagnostic of its pressure sensor and of its signal processing chain to ensure that the sensor module is operating within expected parameters. However, performing the internal diagnostic increases power consumption and reduces the lifetime of the sensor module due to depletion of the battery cell. Hence, it is important to the reduce power consumption for performing these tasks as much as possible.

Accordingly, a sensor module that can reduce power consumption in at least one of these areas may be desirable.

SUMMARY

One or more embodiments provide a pressure sensor module, including: a pressure sensor configured to periodically measure an internal air pressure within an enclosure and generate a sensor signal having plurality of sensor values, wherein each sensor value corresponds to a different pressure measurement taken at a different sampling time; a signal processing chain including at least one signal processing component for conditioning the sensor signal to generate a plurality of conditioned sensor values corresponding to the plurality of sensor values, respectively; a memory configured to store each of the plurality of conditioned sensor values; and a processing circuit coupled to the pressure sensor via the signal processing chain for receiving a current conditioned sensor value corresponding to a current pressure measurement and coupled to the memory for receiving a previous conditioned sensor value corresponding to a previous pressure measurement. The processing circuit is configured monitor for a fault, including calculating a delta pressure value being an absolute value of the difference between the current conditioned sensor value and the previous conditioned sensor value, comparing the delta pressure value to a pressure threshold value, and triggering a diagnostic of the signal processing chain if the delta pressure value is greater than the pressure threshold value.

One or more embodiments provide a sensor module, including: a sensor configured to periodically measure a physical quantity and generate a sensor signal having plurality of sensor values, wherein each sensor value corresponds to a different measurement taken at a different sampling time; a signal processing chain including at least one signal processing component for conditioning the sensor signal to generate a plurality of conditioned sensor values corresponding to the plurality of sensor values, respectively; a memory configured to store each of the plurality of conditioned sensor values; and a processing circuit coupled to the sensor via the signal processing chain for receiving a current conditioned sensor value corresponding to a current measurement and coupled to the memory for receiving a previous conditioned sensor value corresponding to a previous measurement. The processing circuit is configured monitor for a fault, including calculating a delta sensor value being an absolute value of the difference between the current conditioned sensor value and the previous conditioned sensor value, comparing the delta sensor value to a sensor threshold value, and triggering a diagnostic of the signal processing chain if the delta sensor value is greater than the sensor threshold value. The processing circuit includes a controller that is configured to enter a diagnostic mode in response to the delta sensor value being greater than the sensor threshold value. While in the diagnostic mode, the controller is configured to reconfigure the signal processing chain by disconnecting the sensor from an external stimulus such that the sensor generates a diagnostic signal independent from the physical quantity.

One or more embodiments provide a method of performing a self-diagnostic in a sensor module. The method includes: generating, by a sensor, a sensor signal having plurality of sensor values by periodically measuring a physical quantity, wherein each sensor value corresponds to a different measurement taken at a different sampling time; conditioning, by a signal processing chain, the sensor signal to generate a plurality of conditioned sensor values corresponding to the plurality of sensor values, respectively; storing each of the plurality of conditioned sensor values in a memory; receiving, by a processing circuit, a current conditioned sensor value from the signal processing chain and a previous conditioned sensor value from the memory, wherein the current conditioned sensor value corresponds to a current measurement and the previous conditioned sensor value corresponds to a previous measurement; monitoring, by the processing circuit, for a fault, including calculating a delta sensor value being an absolute value of the difference between the current conditioned sensor value and the previous conditioned sensor value, comparing the delta sensor value to a sensor threshold value, and triggering a diagnostic of the signal processing chain if the delta sensor value is greater than the sensor threshold value; entering, by a controller, a diagnostic mode in response to the delta sensor value being greater than the sensor threshold value; and while in the diagnostic mode, reconfiguring, by the controller, the signal processing chain by disconnecting the sensor from an external stimulus such that the sensor generates a diagnostic signal independent from the physical quantity.

BRIEF DESCRIPTION OF THE DRAWINGS

Embodiments are described herein making reference to the appended drawings.

FIG. 3B illustrates a pressure sensor element of a pressure sensor according to one or more embodiments.

DETAILED DESCRIPTION

Figure 1A:
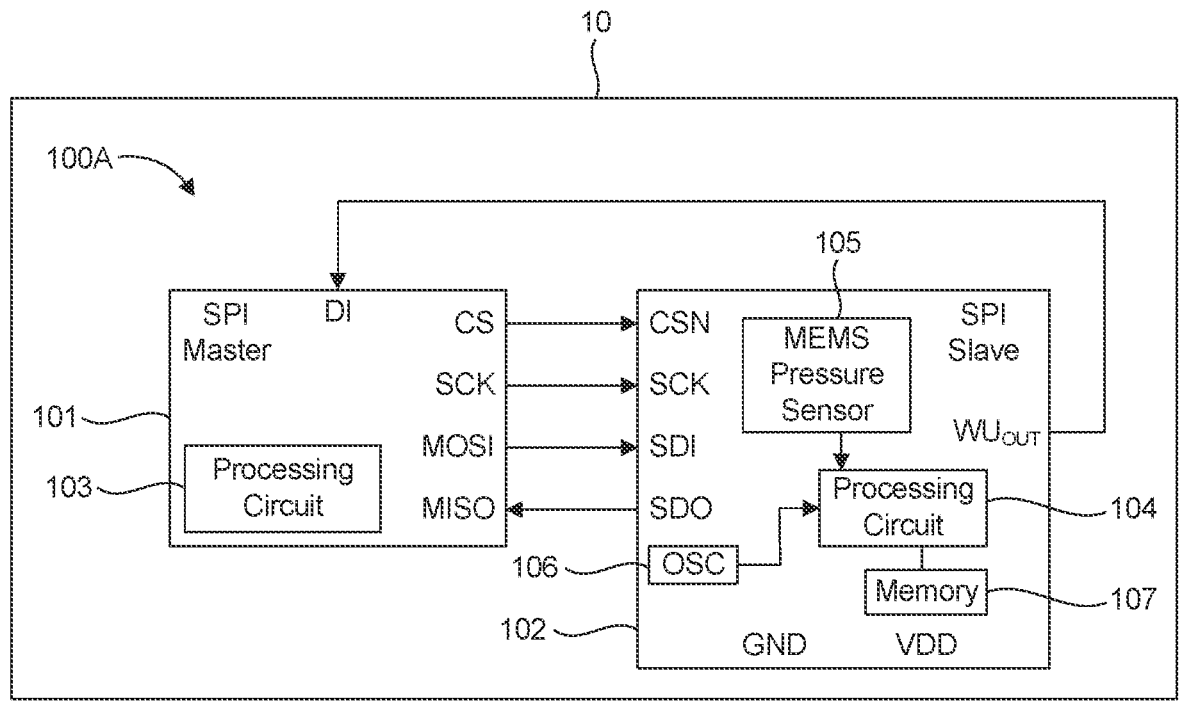
FIG. 1A is a schematic block diagram of a full-duplex Serial Peripheral Interface (SPI) communication system according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "above", "front", "behind", "back", "leading", "trailing", etc., may be used with reference to the orientation of the figures being described. Because parts of embodiments can be positioned in a number of different orientations, the directional terminology is used for purposes of illustration. It is to be understood that other embodiments may be utilized and structural or logical changes may be made without departing from the scope defined by the claims. The following detailed description, therefore, is not to be taken in a limiting sense. Directional terminology used in the claims may aid in defining one element's spatial or positional relation to another element or feature, without being limited to a specific orientation. For example, lateral, vertical, and overlapping spatial or positional relationships may be described in reference to another element or feature, without being limited to a specific orientation of the device as a whole.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The terms "substantially" and "approximately" may be used herein to account for small manufacturing tolerances (e.g., within 5%) that are deemed acceptable in the industry without departing from the aspects of the embodiments described herein. For example, a resistor with an approximate resistance value may practically have a resistance within 5% of that approximate resistance value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

Embodiments relate to sensors and sensor systems, and to obtaining information about sensors and sensor systems. A sensor may refer to a component which converts a physical quantity to be measured to an electric signal, for example, a current signal or a voltage signal. The physical quantity may for example comprise a magnetic field, an electric field, a pressure, an acceleration, a temperature, a force, a current, or a voltage, but is not limited thereto.

A sensor circuit may be referred to as a signal processing circuit and/or a signal conditioning circuit that receives the signal (i.e., sensor signal) from the sensor in the form of raw measurement data. The sensor circuit may include an analog-to-digital converter (ADC) that converts the analog signal from the sensor to a digital signal. The sensor circuit may also include a digital signal processor (DSP) that performs some processing on the digital signal (e.g., to prepare sensor information for evaluation or transmission). Therefore, the sensor package comprises a circuit which conditions and amplifies the small signal of the sensor via signal processing and/or conditioning.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, downsampling, biasing, range matching, isolation and any other processes required to make a sensor output suitable for processing after conditioning.

According to one or more embodiments, a sensor and a sensor circuit are both accommodated (i.e., integrated) in the same chip package (e.g., a plastic encapsulated package, such as leaded package or leadless package, or a surface mounted device (SMD)-package). This chip package is also referred to as sensor package. The sensor package may be combined with other components to form a sensor module, sensor device, or the like.

A sensor device, as used herein, may refer to a device which includes a sensor and sensor circuit as described above. A sensor device may be integrated on a single semiconductor die (e.g., silicon die or chip), although, in other embodiments, a plurality of dies may be used for implementing a sensor device. Thus, the sensor and the sensor circuit are disposed on either the same semiconductor die or on multiple dies in the same package. For example, the sensor might be on one die and the sensor circuit on another die such that they are electrically connected to each other within the package. In this case, the dies may be comprised of the same or different semiconductor materials, such as GaAs and Si, or the sensor might be sputtered to a ceramic or glass platelet, which is not a semiconductor.

As SPI is a full-duplex device, it will have separate pins for input data and output data. A half-duplex is similar to the true SPI, but one pin is used for I/O (input and output). To configured the host adapter, insert a 10$k$ resistor between the MOSI signal and the MISO signal, and then connect the MISO line to the data line of the SPI slave device.

FIG. 1A is a schematic block diagram of a Serial Peripheral Interface (SPI) communication system 100A according to one or more embodiments. In particular, the communication system 100A is a battery monitoring system configured to monitor a status of a battery 10. For example, the communication system 100A can be arranged inside an enclosure of a battery 10 in the electric car to detect thermal runaway. This can be detected as a jump in the pressure inside the enclosure. Alternatively, the communication system 100A may be a tire pressure monitoring system in which at least a slave device 102 is arranged inside a tire to measure the internal air pressure thereof. In this case, a wireless communication interface may be used to communicated with the master device 101 instead of an SPI communication interface. Other types of sensors configurable in a low power monitoring (LPM) mode and which periodically measure a physical quantity according to the sampling phase of the LPM mode are also applicable.

The SPI communication system 100A includes an SPI master device 101, such as a microcontroller, and a SPI slave device 102, such as a peripheral device. In this example, the SPI slave device 102 is a sensor device that includes a pressure sensor 105. Thus, the SPI slave device 102 may also be referred to as a sensor device 102. The SPI slave device 102 can be any integrated circuit (i.e., chip) comprising a data register and capable performing data operations (e.g., read and write operations) from/to the data register at the control of the SPI master device 101. Here, a read operation is a data transmission originating at the SPI slave device 102 and terminating at the SPI master device 101 and a write operation is a data transmission originating at the SPI master device 101 and terminating at the SPI slave device 102. The master and slave devices each include at least one processor (i.e., a processing circuit) for performing their data operations.

For example, the processing circuit of the SPI slave device 102 may include a decoder for decoding SPI communications from the SPI master devise 101. The processing circuit of the SPI slave device 102 may also detect falling and rising edges of a chip select signal and count the number of clock cycles therebetween. Additionally, the processing circuitry 104 of the slave device 102 is configured to process sensor data received from the pressure sensor 105, perform computations thereon, and generate data signals based on the processed sensor data.

The master and slave devices both include an SPI clock (SCK) terminal or pin connected by a clock signal line. The device that generates the clock signal SCK is called the master. Data transmitted between the master and the slave is synchronized to the clock generated by the master. During SPI communication, the data is simultaneously transmitted (shifted out serially onto the MOST/SDI bus) and received (the data on the bus (MISO/SDO) is sampled or read in). The serial clock edge synchronizes the shifting and sampling of the data. The SPI interface provides the user with flexibility to select the rising or falling edge of the clock to sample and/or shift the data. Each clock cycle represents a bit.

For example, data present at Serial Data Input (SDI) may be latched on the rising edge of the clock signal SCK and data on Serial Data Out (SDO) may be shifted out at the falling edge of clock signal SCK. The SDI is a data input terminal of the slave device 102 and is connected to the master out, slave in (MOSI) terminal of the master device 101 by a data line. The master device 101 transmits information, including control information and data, to the slave device 102 via its MOSI terminal. The SDI terminal is used to transfer data serially into the slave device. It receives the data to be written. The SDO is a data output terminal of the slave device 102 and is connected to the master in, slave out (MISO) terminal of the master device 101 by a data line. The master device 101 receives (reads) information, from the slave device 102 via its MISO terminal. The SDO terminal is used to transfer data serially out of the slave device. It transmits the data to be read.

Chip Select Not (CSN): when this input signal is High, the device is not selected and Serial Data Output (SDO) is set to a high impedance. Driving this input Low enables the communication. The communication must start and stop on a Low level of Serial Clock (SCK).

The master and slave devices both include corresponding chip select terminals connected by a select signal line. On the master device side, its chip select (CS) terminal is responsible for outputting a chip select signal. The chip select terminal of the slave device is a chip select not (CSN) terminal, meaning that the chip select signal is an active low signal. The chip select signal is transmitted from the master device 101 and is used to select and/or enable the slave device 102 for SPI communication. The chip select signal is low when communication with the slave device 102 is enabled and is pulled high to disconnect the slave device 102 from the SPI bus, thereby disabling communication with the slave device 102. More particularly, when the chip select signal is pulled high, the SDO terminal is placed in high impedance. Driving this input low enables the communication. Thus, the master device 101 must send a logic 0 on this CS signal to select the slave device 102.

An SPI communication frame (i.e., a CS frame) is defined by an interval during which the CS signal is low (logic 0) between two consecutive high (logic 1) signal levels. Thus, a falling edge of the CS signal from high-to-low denotes a start of a CS frame and the next edge (i.e., a rising edge) from low-to-high denotes an end of the CS frame. Each CS frame is a predetermined number of clock cycles in length corresponding to the number of bytes of the SPI buffer. For example, for an x-byte SPI buffer, each CS frame is x-bytes in length, where x is an integer greater than one. Two consecutive CS frames are separated by an idle period during which the CS signal is high (logic 1) and communication from the slave device 102 is disabled.

The master device 101 includes processing circuitry 103 that performs the functions of the master device 101 described herein for performing SPI communications, including signal generation (e.g., CS, SCK, and MOSI signals) including synchronization and control of the slave device 101, signal reception (e.g., MISO signals) and the processing thereof, data sampling in from the MISO data line, shifting data out onto the MOSI signal line, register address incrementation and tracking, register address evaluation, and processing data received from the slave device 102, and processing of fault signals received from the slave device 102 and taking action in response thereto. The processing circuitry 103 may include at least one processor and other processing circuitry configured to process, condition, evaluate, encode, or decode signals and data.

Similarly, the slave device 102 includes processing circuitry 104 that performs the functions of the slave device 102 described herein for performing SPI communications, including signal generation (e.g., MISO signals), signal reception (e.g., CS, SCK, and MOSI signals) and the processing thereof, data sampling in from the MOSI data line, shifting data out onto the MISO data line, register address incrementation and tracking, register address evaluation, processing commands and data received from the master device 101 (e.g., entering low power monitoring (LPM) mode), processing of sensor signals, detecting faults, and communicating detected faults to the master device.

The processing circuitry 104 may include at least one processor and other processing circuitry configured to process, condition, evaluate, encode, or decode signals and data. For example, the processing circuitry 104 may signal processing chain including an ADC configured to acquire samples from the sensor 105 at each clock cycle, a downsampler configured to perform down sampling on the digital signal (e.g., using a digital lowpass filter to remove high-frequency signal components and a decimator that decimates the filtered signal by an integer factor of X so that only the Xth sample is provided to a processor for evaluation), additional filters as needed, and a processor at the end of the signal processing chain that performs evaluation on a digital sensor value. Comparators may also be used for performing a comparison to a threshold value.

The SPI shown in FIG. 1A is a full-duplex interface; both master and slave can send data at the same time via the MOSI and MISO data lines respectively. Here, separate pins are present for input data and output data. It is also noted that ground GND and VDD pins are also shown for the slave device 102. In full communication mode (i.e., duplex mode), a command is received via SDI terminal of the SPI interface and the response for the current command is provided on the SDO terminal during the next command (i.e., during the next SPI communication frame), including diagnosis information regarding the sanity or validity of the SPI communication.

Figure 1B:
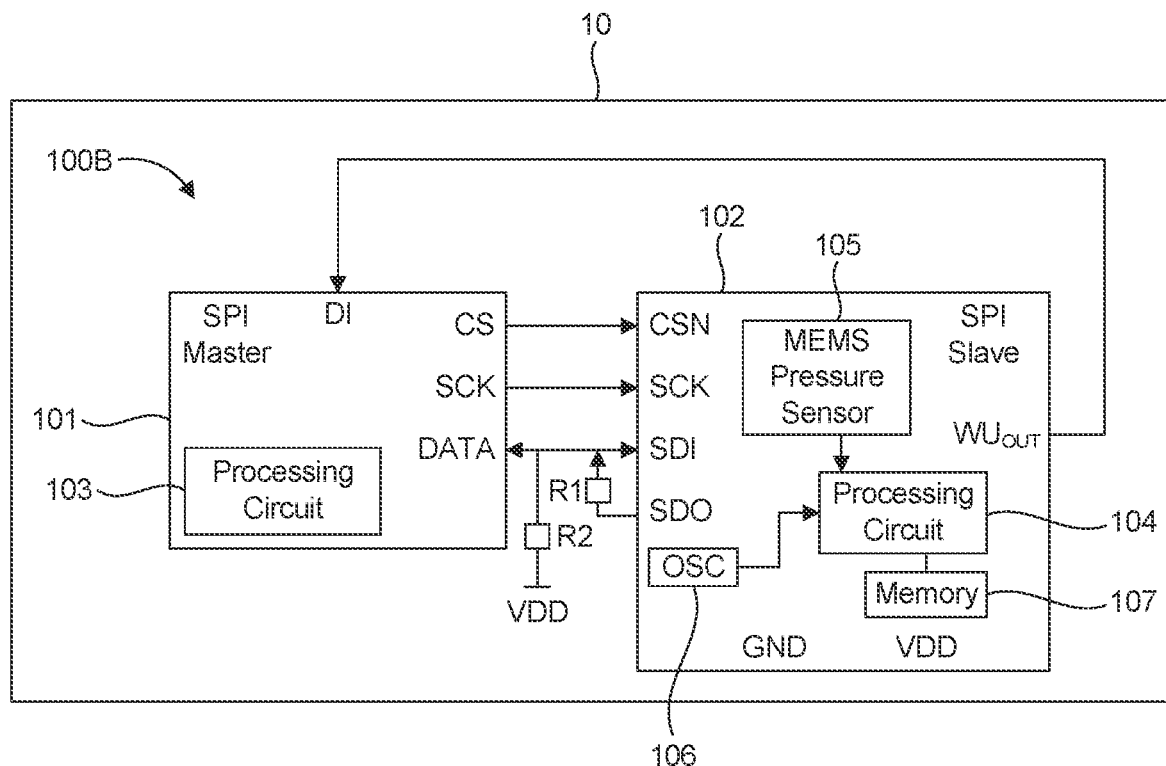
FIG. 1B is a schematic block diagram of a half-duplex SPI communication system according to one or more embodiments.

FIG. 1B is a schematic block diagram of a SP) communication system 100B according to one or more embodiments. The communication system 100B is similar to that of communication system 100A, except its SPI interface is a half-duplex interface. This means the master device 101 includes one data terminal DATA for data input and output and the SDI and SDO terminals of the slave device 102 share this DATA terminal for communication. As a result, only the master or the slave can transmit at any given communication frame via time multiplexing. To configure the communication system 100B in half-duplex, a resistor R1 is connected to and between the data signal line and the SDO terminal. Additionally, another resistor R2 is connected to and between the data signal line and a high supply potential VDD. This represents one example of a half-duplex configuration.

The communication system 100B may also a battery monitoring system that is arranged inside an enclosure of a battery 10 for monitoring a status thereof. Accordingly, aside from one system being full-duplex and the other system being half-duplex, it can be assumed that both systems incorporate similar features. Thus, unless explicitly stated otherwise, features of the example embodiments described herein apply to both communication systems.

Like communication system 100A, communication system 100B may be a tire pressure monitoring system in which at least the slave device 102 is arranged inside a tire to measure the internal air pressure thereof. In this case, a wireless communication interface may be used to communicated with the master device 101 instead of an SPI communication interface. Other types of sensors configurable in a low power monitoring (LPM) mode and which periodically measure a physical quantity according to the sampling phase of the LPM mode may also be applicable.

The sensor device 102 is configured to monitor the battery 10 throughout the lifetime of the battery 10. As a result, the average current consumption of the microcontroller 101 and sensor device 102 needs to be low. Both communication systems 100A and 100B are configurable in LPM mode. When this occurs, both the master device 101 and the sensor device 102 enter into a low power state to reduce power consumption. Before the master device 101 enters its low power mode, it sends a commend to the sensor device 102 to enter LPM mode. The microcontroller 101 wakes up from low power mode to communicate with the sensor device 102 via the SPI interface and/or to perform fault analysis in response to receiving a fault from the sensor device 102. On the other hand, LPM mode of the sensor device 102 is a pulse-width modulation (PWM) mode during which the sensor device 102 periodically wakes up to acquire a sensor measurement via the pressure sensor 105 and determine whether a battery fault exists before powering down between samples. Thus, while in LPM mode, the internal supply of the sensor device 102 is reduced to a low power level in order to reduce current consumption and to save power. The sensor device 102 may enter the LPM mode in response to the master device 101 (microcontroller) transmitting an "enter LPM mode" SPI command to the sensor device 102. The processing circuitry 104 also performs internal checks when it wakes up to verify that it is operating normally or whether a system fault exists. For example, the processing circuitry 104 may evaluate its own signal processing path for detecting a fault present on the signal processing path.

As a self wake-up system, the sensor device 102 includes a low power oscillator (OSC) 106 used to wake-up the chip at regular intervals. The LPM mode includes a sampling phase triggered based on the clock signal generated by the low power oscillator 106, during which a sensor measurement is acquired and analyzed, and a powered down phase during which the sensor device 102 is in a low power state.

the power down intervals are typically much longer than the sampling intervals according to a PWM duty cycle to converse power. The processing circuitry 104 may wake up every N clock cycles and define a sampling period by M clock cycles, where N and M are integers with N>M.

In LPM mode, the sensor device 102 periodically wakes up (powers up) to monitor the pressure differential inside the enclosure and alerts the microcontroller 101 via a dedicated wakeup out (WUout) pin if the pressure differential exceeds an expected result. Thermal runaway in the battery enclosure result in a sharp increase in ambient pressure within the battery enclosure that can be detected. The fault signal is sent via the WUout pin to wake up the microcontroller 101 to perform fault analysis and calculations. The microcontroller 101 receives the fault signal at a Digital Input (DI) terminal, wakes up from low power mode, identifies the type of fault being signaled, and performs fault analysis. Upon waking up, the microcontroller 101 may wake up sensor device 102 by driving the chip select signal low and may request additional data from the slave device via the SPI interface (e.g., via the data in SDI and data out SDO signal lines).

The DI terminal is part of a digital communication interface that is separate from the SPI. Likewise, the WUout terminal is part of a digital communication interface that is separate from the SPI. The WUout terminal is used to communicate all errors and faults detected by the sensor device 102. That is the SDO terminal is not used to communicate (e.g., indicate or flag) errors and faults, but may be used to transmit diagnostic information related to a detected fault at the command of the microcontroller 101 (e.g., the microcontroller sends an SPI command via its MOSI terminal instructing the sensor device 102 to transmit diagnostic information).

According to the disclosed embodiments, the WUout terminal is used in both LPM mode and in full communication mode (i.e., normal running mode). In LPM mode, the processing circuitry 104 uses the WUout terminal to transmit various types of fault signals, including detected pressure abnormalities and internal faults, to the microcontroller 101 to alert the microcontroller 101 of any safety-related malfunction of the sensor device 102 detected while in LPM mode. If in a low power mode, the microcontroller 101 wakes up in response to any fault signal received via its DI terminal to perform a fault analysis.

Additionally, the sensor device 102 includes a memory 107 that is configured to store sensor values and output a previous sensor value (e.g., the most recent sensor value from a previous measurement) to be used to calculate a delta sensor value.

Figure 2:
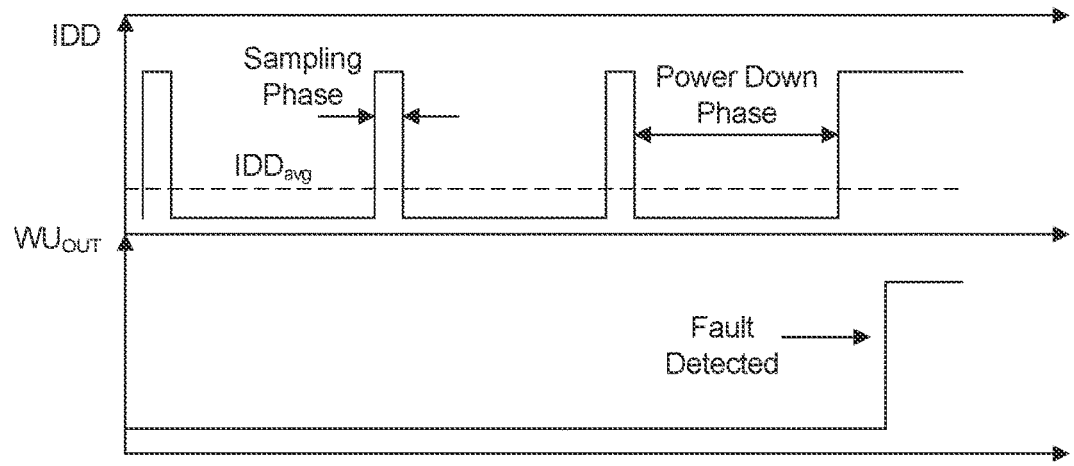
FIG. 2 illustrates signal diagrams of a current consumption of the sensor device and a fault signal according to one or more embodiments.

FIG. 2 illustrates signal diagrams of a current consumption of the sensor device and a fault signal according to one or more embodiments. Specifically, the top waveform is a current consumption of current IDD by the sensor device 102 while configured in LPM mode. The waveform of the current consumption has a PWM duty cycle corresponding to the sampling phase and the power down phase of the sensor device 102 in LPM mode. The current consumption increases to sample the sensor signal and evaluate the measured pressure. The current consumption decreases between sampling phases to reduce the average current consumption IDDavg of the sensor device 102.

Additionally, the output signal of the WUout terminal remains low in the absence of a fault, but is toggled high when a fault is detected to notify the microcontroller 101 of the fault. The sensor device 102 may also exit the LPM mode when the output signal of the WUout terminal is toggled high.

Figure 3A:
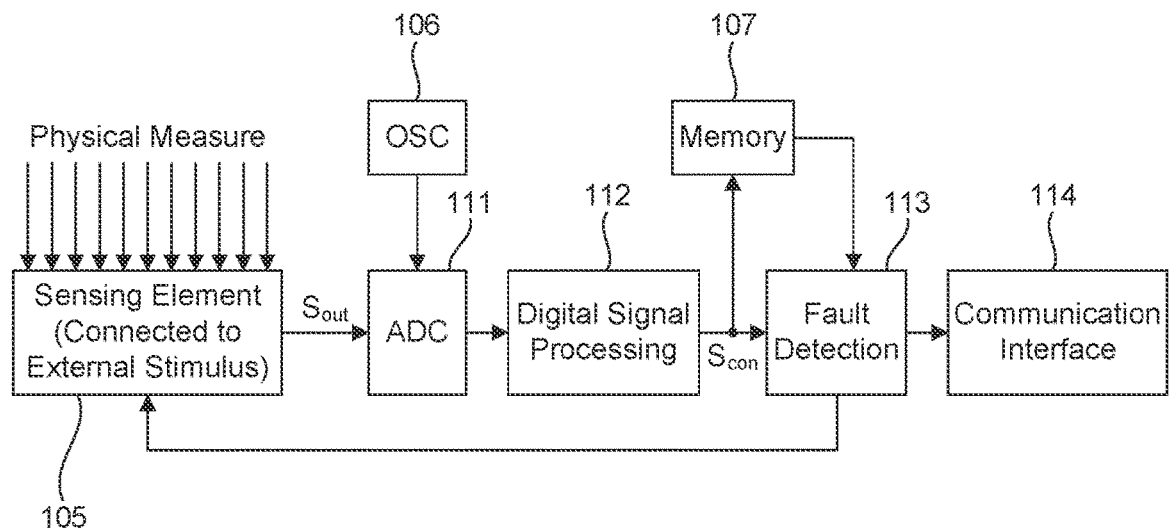
FIG. 3A is a schematic block diagram of a signal path of a sensor device that is configured in a normal measurement configuration according to one or more embodiments.

FIG. 3A is a schematic block diagram of a signal path of the sensor device 102 that is configured in a normal measurement configuration according to one or more embodiments. In particular, the sensor device 102 includes a controller 113 that is configured to reconfigure the signal path, including the sensor 105 and a signal processing chain, between a normal measurement configuration and a diagnosis measurement configuration. The controller 113 may be a microcontroller that includes a processor and/or a comparator for performing evaluations on sensor measurements and diagnostic measurements, both of which originate from the pressure sensor 105, for detecting abnormal pressure faults from the measured air pressure or internal signal path faults from the signal path diagnostic.

FIG. 3B illustrates a pressure sensor element of a pressure sensor 105 according to one or more embodiments. The sensing element includes of a two sensing MEMS capacitors 105a and 105b and two reference MEMS capacitors 105c and 105d. The capacitances of the two sensing MEMS capacitors 105a and 105b are variable based on the pressure acting on the pressure sensor element, whereas the capacitances of the two reference MEMS capacitors 105c and 105d are fixed with a capacitance CO. The two sensing MEMS capacitors 105a and 105b have a capacitance CO plus a variable capacitance offset dC that varies based on the ambient pressure. The variable capacitance offset dC is proportional to the ambient pressure. The four MEMS capacitors 105a-105d are connected in a bridge configuration. Input terminals are connected to a supply potentials Vi and GND, respectively, and output terminals Vo+ and Vo− are used to read out a differential signal as a sensor output signal Sout that equals Vo+−Vo−.

In the normal measurement configuration, the signal processing chain connects to the bridge which has the capacitance branches in antiphase to read the differential capacitance proportional to the ambient pressure. In this way, a change in pressure will dictate a change in sensing capacitance and will yield a different response of the sensor output signal Sout. In other words, in the normal measurement configuration, the pressure sensor 105 generates a pressure measurement signal as the sensor output signal Sout that is dependent on the air pressure acting on the sensor 105.

In the diagnosis measurement configuration, the signal processing chain connects to the bridge which has the capacitance branches in phase to read the differential capacitance independent of ambient pressure. In this case, the difference cancels the dC variation since Vo+ is equal to Vo− for any ambient pressure, meaning the sensor output signal should be zero for all ambient pressures when the sensor is operating correctly. In this configuration, the system can sense drifts appearing in the capacitance CO of any of the four capacitances in the bridge if the sensor output signal deviates from zero. In this way, the outside air pressure does not influence the response of the sensor output signal Sout and the value output by the signal processing chain is expected to be a constant or substantially constant value if the sensor 105 and the signal processing chain are operating normally. In other words, in the diagnosis measurement configuration, the pressure sensor 105 generates a diagnostic signal as the sensor output signal Sout that is independent from the air pressure acting on the sensor 105.

Switches may be utilized to reconfigure the output of the bridge and the controller 113 may control the switches in order to configure the sensor element as part of the signal path into either the normal measurement configuration or the diagnosis measurement configuration.

Turning back to RIG. 3A, the signal processing chain includes an ADC 111 configured to sample the sensor output signal Sout at different sampling times based on the oscillator signal or a system clock and convert the samples (i.e., the analog sensor values) into digital sensor values, each corresponding to a different sampling time taken are regular intervals. The signal processing chain further includes a digital signal processing chain 112 that includes, for example, a downsampling circuit and/or a digital low pass filter. The result is a conditioned sensor signal Scon that is converted into the digital domain and processed to be ready for evaluation. Each of the conditioned sensor signal Scon includes a plurality of conditioned sensor values, each of which corresponds to one of the analog sensor values sampled from the sensor output signal Sout by the ADC 111.

The memory device 107 is configured to store the conditioned sensor value of a current measurement to be used as a previous conditioned sensor value for the next measurement evaluation. The controller 113 is configured to receive a current conditioned sensor value corresponding to a current pressure measurement and received a previous conditioned sensor value corresponding to a previous pressure measurement from the memory device 107 in order to calculate the difference therebetween. The previous pressure measurement is a pressure measurement taken most proximate in time to the current pressure measurement.

The controller 113 calculates the delta pressure value as an absolute value of the difference between the current conditioned sensor value and the previous conditioned sensor value. The controller 113 then compares the delta pressure value to a pressure threshold value (e.g., 1 kPa) and triggers a diagnostic of the sensor and the signal processing chain if the delta pressure value is greater than the pressure threshold value. Otherwise, the pressure sensor 105 remains in normal measurement configuration.

By triggering a diagnostic, the controller 113 configures the pressure sensor 105 into the diagnosis measurement configuration. Additionally, a communication interface 114 (e.g., SPI or wireless) may transmit valid sensor information to the microcontroller 101 in the normal measurement configuration or may transmit a detected fault to the microcontroller 101 in the diagnosis measurement configuration. It is noted that the normal measurement configuration and the diagnosis measurement configuration are mutually exclusive modes and the transition between the two can happen in either normal running mode or in LPM mode.

Figure 3C:
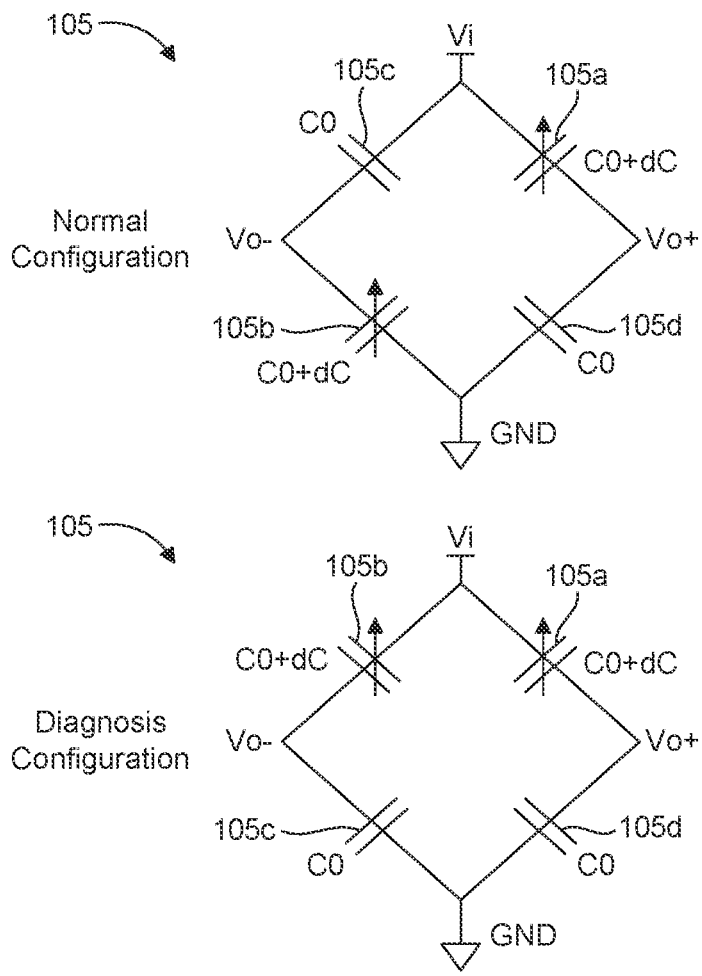
FIG. 3C is a schematic block diagram of a signal path of a sensor device that is configured in a diagnostic measurement configuration according to one or more embodiments.
Figure 3C:
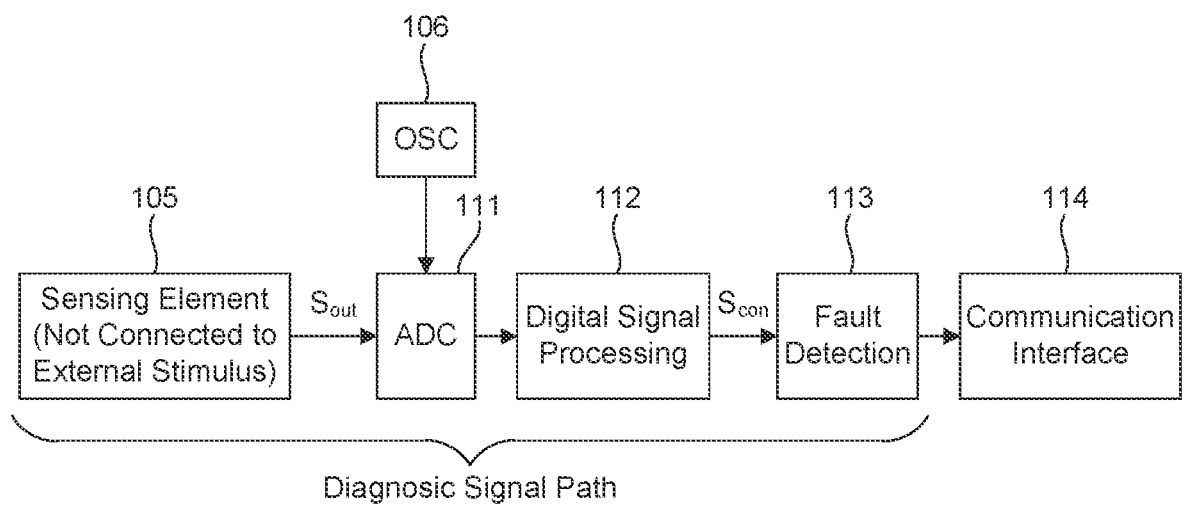

FIG. 3C is a schematic block diagram of a signal path of the sensor device 102 that is configured in a diagnostic measurement configuration according to one or more embodiments. A fault on the signal path has a very high probability of triggering a large shift (higher than a predetermined threshold) in the sensor output signal Sout. In other words, any fault on the signal path has a very high probability of triggering the signal path diagnosis and therefore manages to fulfill the required (low) current consumption in LPM mode and covers single point faults.

As noted above, in the diagnostic mode, the controller 113 is configured to reconfigure the sensor signal path by disconnecting the pressure sensor from an external stimulus such that the pressure sensor 105 generates a diagnostic signal as the sensor output signal Sout that is independent from the air pressure (i.e., the measurable physical quantity).

The controller 113, coupled to the pressure sensor 105 via the signal processing chain, is configured to receive a conditioned diagnostic signal derived from the diagnostic signal being conditioned by the signal processing chain. The controller 113 compares the conditioned diagnostic signal to a predetermined diagnostic threshold and detects a signal path fault if the conditioned diagnostic signal exceeds the diagnostic threshold. More specifically, since the conditioned diagnostic signal received by the controller 113 is expected to be constant or substantially constant (e.g., due to slight noise components), the controller 113 may be configured to compare the conditioned diagnostic signal to a diagnostic threshold range (i.e., defined by a maximum and minimum threshold value) and detect the fault as the signal path fault if the conditioned diagnostic signal is outside the diagnostic threshold range. The controller 113 can signal this fault to the microcontroller 101 via the communication interface 114.

During the diagnostic mode, if the conditioned diagnostic signal does not exceed the diagnostic threshold range, the controller 113 is configured to detect the fault as an air pressure fault as a result of the delta pressure value being greater than the pressure threshold value. In other words, the controller 113 rules out that the large signal change detected in the delta signal value was caused by an internal signal path fault of the sensor device 102. Instead, an abnormal condition external to the sensor device 102 may have caused the large signal change. The controller 113 can signal this fault to the microcontroller 101 via the communication interface 114.

Thus, the controller 113 is configured to determine whether the conditioned diagnostic signal remains within a diagnostic threshold range while the pressure sensor is disconnected from an external stimulus. If the conditioned diagnostic signal Scon remains within the diagnostic threshold range while the pressure sensor is disconnected from an external stimulus, the controller 113 determines that the detected fault is an air pressure fault. On the other hand, if the conditioned diagnostic signal Scon exceeds the diagnostic threshold range while the pressure sensor is disconnected from an external stimulus, the controller 113 determines that the detected fault as an internal signal path fault.

Moreover, another option, the controller 113 may be configured to determine whether the conditioned diagnostic signal remains constant while the pressure sensor is disconnected from an external stimulus. If the conditioned diagnostic signal remains constant while the pressure sensor is disconnected from an external stimulus, the controller 113 determines that the detected fault is an air pressure fault. If the conditioned diagnostic signal does not remain constant while the pressure sensor is disconnected from an external stimulus, the controller 113 determines that the detected fault is an internal signal path fault. Thus, during the diagnostic mode, the controller 113 is configured to determine whether the fault detected by the delta sensor value exceeding the pressure threshold value is an internal signal path fault originating from the pressure sensor itself or a pressure fault due to an abnormal increase in the internal air pressure external to the pressure sensor.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer, or an electronic circuit. In some embodiments, some one or more of the method steps may be executed by such an apparatus.

It is further to be noted that methods disclosed in the specification or in the claims may be implemented by a device having means for performing each of the respective acts of these methods. Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application-specific integrated circuits (ASICs), field programmable logic arrays (FPGAs), programmable logic controller (PLC), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. A control unit may use electrical signals and digital algorithms to perform its receptive, analytic, and control functions, which may further include corrective functions. Such hardware, software, and firmware may be implemented within the same device or within separate devices to support the various techniques described in this disclosure.

One or more aspects of the present disclosure may be implemented as a non-transitory computer-readable recording medium having recorded thereon a program embodying methods/algorithms for instructing the processor to perform the methods/algorithms. Thus, a non-transitory computer-readable recording medium may have electronically readable control signals stored thereon, which cooperate (or are capable of cooperating) with a programmable computer system such that the respective methods/algorithms are performed. The non-transitory computer-readable recording medium can be, for example, a RAM, a ROM, a PROM, an EPROM, an EEPROM, a FLASH memory, or an electronic memory device.

Although various embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A pressure sensor module, comprising:
a pressure sensor configured to periodically measure an internal air pressure within an enclosure and generate a sensor signal having a plurality of sensor values, wherein each sensor value, of the plurality of sensor values, corresponds to a different pressure measurement taken at a different sampling time;
a signal processing chain comprising at least one signal processing component for conditioning the sensor signal to generate a plurality of conditioned sensor values corresponding to the plurality of sensor values, respectively;
a memory configured to store each of the plurality of conditioned sensor values; and
a processing circuit coupled to the pressure sensor via the signal processing chain for receiving a current conditioned sensor value corresponding to a current pressure measurement and coupled to the memory for receiving a previous conditioned sensor value corresponding to a previous pressure measurement,
wherein the processing circuit is configured monitor for a fault, including calculating a delta pressure value being an absolute value of a difference between the current conditioned sensor value and the previous conditioned sensor value, comparing the delta pressure value to a pressure threshold value, and triggering a diagnostic of the signal processing chain if the delta pressure value is greater than the pressure threshold value.

2. The pressure sensor module of claim 1, wherein the pressure sensor is configured to periodically measure the internal air pressure at regular intervals.

3. The pressure sensor module of claim 1, wherein the previous pressure measurement is a pressure measurement taken most proximate in time to the current pressure measurement.

4. The pressure sensor module of claim 1, wherein the at least one signal processing component includes an analog-to-digital converter (ADC).

5. The pressure sensor module of claim 4, wherein the at least one signal processing component includes a filter.

6. The pressure sensor module of claim 1, wherein the pressure threshold value is at least 1 kPa.

7. The pressure sensor module of claim 1, wherein the processing circuit is configurable between a normal running mode and a low power monitoring (LPM) mode, wherein, in the LPM mode, the processing circuit configured to alternate between a sampling phase and a powered down phase during which the processing circuit is in a low power state, wherein during the sampling phase, the processing circuit exits the low power state to acquire the current conditioned sensor value and evaluate the delta pressure value against the pressure threshold value.

8. The pressure sensor module of claim 7, wherein, in response to triggering a diagnostic of the signal processing chain in LPM mode, the processing circuit is configured to exit LPM mode and enter the normal running mode.

9. The pressure sensor module of claim 7, wherein, in the LPM mode, the processing circuit is configured switch between the sampling phase and the powered down phase according to a pulse width modulation (PWM) duty cycle such that the processing circuit periodically wakes-up automatically at regular intervals from the low power state in order to enter into the sampling phase, wherein the sampling phase is defined by a first level of the PWM duty cycle and the powered down phase is defined by a second level of the PWM duty cycle.

10. The pressure sensor module of claim 1, wherein the processing circuit includes a controller configured to reconfigure the signal processing chain for performing the diagnostic of the signal processing chain.

11. The pressure sensor module of claim 1, wherein the processing circuit includes a controller that is configured to enter a diagnostic mode in response to the delta pressure value being greater than the pressure threshold value,
   wherein in the diagnostic mode, the controller is configured to reconfigure the signal processing chain by disconnecting the pressure sensor from an external stimulus such that the pressure sensor generates a diagnostic signal independent from the internal air pressure.

12. The pressure sensor module of claim 11, wherein, during the diagnostic mode:
   the processing circuit, coupled to the pressure sensor via the signal processing chain, is configured to receive a conditioned diagnostic signal derived from the diagnostic signal being conditioned by the signal processing chain, and
   the processing circuit is configured to compare the conditioned diagnostic signal to a diagnostic threshold and detect the fault as a signal path fault if the conditioned diagnostic signal exceeds the diagnostic threshold.

13. The pressure sensor module of claim 12, wherein during the diagnostic mode:
   the processing circuit is configured to compare the conditioned diagnostic signal to a diagnostic threshold range and detect the fault as the signal path fault if the conditioned diagnostic signal is outside the diagnostic threshold range.

14. The pressure sensor module of claim 13, wherein during the diagnostic mode:
   if the conditioned diagnostic signal does not exceed the diagnostic threshold range, the processing circuit is configured to detect the fault as an air pressure fault as a result of the delta pressure value being greater than the pressure threshold value.

15. The pressure sensor module of claim 11, wherein, during the diagnostic mode:
   the processing circuit, coupled to the pressure sensor via the signal processing chain, is configured to receive a conditioned diagnostic signal derived from the diagnostic signal being conditioned by the signal processing chain,
   the processing circuit is configured to determine whether the conditioned diagnostic signal remains within a diagnostic threshold range while the pressure sensor is disconnected from an external stimulus,
   if the conditioned diagnostic signal remains within the diagnostic threshold range while the pressure sensor is disconnected from an external stimulus, the processing circuit configured to detect the fault as an air pressure fault, and
   if the conditioned diagnostic signal exceeds the diagnostic threshold range while the pressure sensor is disconnected from an external stimulus, the processing circuit configured to detect the fault as an internal signal path fault.

16. The pressure sensor module of claim 11, wherein, during the diagnostic mode:
   the processing circuit, coupled to the pressure sensor via the signal processing chain, is configured to receive a conditioned diagnostic signal derived from the diagnostic signal being conditioned by the signal processing chain,
   the processing circuit is configured to determine whether the conditioned diagnostic signal remains constant while the pressure sensor is disconnected from an external stimulus,
   if the conditioned diagnostic signal remains constant while the pressure sensor is disconnected from an external stimulus, the processing circuit configured to detect the fault as an air pressure fault, and
   if the conditioned diagnostic signal does not remain constant while the pressure sensor is disconnected from an external stimulus, the processing circuit configured to detect the fault as an internal signal path fault.

17. The pressure sensor module of claim 1, wherein, in response to the delta pressure value being greater than the pressure threshold value, the controller is configured to enter a diagnostic mode,
   wherein during the diagnostic mode, the processing circuit is configured to determine whether the fault is an internal signal path fault originating from the pressure sensor module or a pressure fault due to an abnormal increase in the internal air pressure external to the pressure sensor module.

18. A sensor module, comprising:
   a sensor configured to periodically measure a physical quantity and generate a sensor signal having plurality of sensor values, wherein each sensor value, of the plurality of sensor values, corresponds to a different measurement taken at a different sampling time;
   a signal processing chain comprising at least one signal processing component for conditioning the sensor signal to generate a plurality of conditioned sensor values corresponding to the plurality of sensor values, respectively;
   a memory configured to store each of the plurality of conditioned sensor values; and
   a processing circuit coupled to the sensor via the signal processing chain for receiving a current conditioned sensor value corresponding to a current measurement and coupled to the memory for receiving a previous conditioned sensor value corresponding to a previous measurement,
   wherein the processing circuit is configured monitor for a fault, including calculating a delta sensor value being an absolute value of a difference between the current conditioned sensor value and the previous conditioned sensor value, comparing the delta sensor value to a sensor threshold value, and triggering a diagnostic of the signal processing chain if the delta sensor value is greater than the sensor threshold value,
   wherein the processing circuit includes a controller that is configured to enter a diagnostic mode in response to the delta sensor value being greater than the sensor threshold value, and
   wherein in the diagnostic mode, the controller is configured to reconfigure the signal processing chain by disconnecting the sensor from an external stimulus such that the sensor generates a diagnostic signal independent from the physical quantity.

19. The pressure sensor module of claim 18, wherein, during the diagnostic mode:
   the processing circuit, coupled to the sensor via the signal processing chain, is configured to receive a conditioned diagnostic signal derived from the diagnostic signal being conditioned by the signal processing chain, and
   the processing circuit is configured to compare the conditioned diagnostic signal to a diagnostic threshold and detect the fault as an internal signal path fault if the conditioned diagnostic signal exceeds the diagnostic threshold.

20. The pressure sensor module of claim 19, wherein during the diagnostic mode:
the processing circuit is configured to compare the conditioned diagnostic signal to a diagnostic threshold range and detect the fault as the internal signal path fault if the conditioned diagnostic signal is outside the diagnostic threshold range.

21. The pressure sensor module of claim 20, wherein during the diagnostic mode:
if the conditioned diagnostic signal does not exceed the diagnostic threshold range, the processing circuit is configured to detect the fault as an external fault as a result of the delta sensor value being greater than the sensor threshold value.

22. A method of performing a self-diagnostic in a sensor module, the method comprising:
generating, by a sensor, a sensor signal having plurality of sensor values by periodically measuring a physical quantity, wherein each sensor value, of the plurality of sensor values, corresponds to a different measurement taken at a different sampling time;
conditioning, by a signal processing chain, the sensor signal to generate a plurality of conditioned sensor values corresponding to the plurality of sensor values, respectively;
storing each of the plurality of conditioned sensor values in a memory;
receiving, by a processing circuit, a current conditioned sensor value from the signal processing chain and a previous conditioned sensor value from the memory, wherein the current conditioned sensor value corresponds to a current measurement and the previous conditioned sensor value corresponds to a previous measurement;
monitoring, by the processing circuit, for a fault, including calculating a delta sensor value being an absolute value of a difference between the current conditioned sensor value and the previous conditioned sensor value, comparing the delta sensor value to a sensor threshold value, and triggering a diagnostic of the signal processing chain if the delta sensor value is greater than the sensor threshold value;
entering, by a controller, a diagnostic mode in response to the delta sensor value being greater than the sensor threshold value; and
while in the diagnostic mode, reconfiguring, by the controller, the signal processing chain by disconnecting the sensor from an external stimulus such that the sensor generates a diagnostic signal independent from the physical quantity.

\* \* \* \* \*